United States Patent
Hager et al.

(10) Patent No.: US 7,103,212 B2
(45) Date of Patent: Sep. 5, 2006

(54) ACQUISITION OF THREE-DIMENSIONAL IMAGES BY AN ACTIVE STEREO TECHNIQUE USING LOCALLY UNIQUE PATTERNS

(75) Inventors: Gregory D. Hager, Baltimore, MD (US); Eliot Leonard Wegbreit, Palo Alto, CA (US)

(73) Assignee: Strider Labs, Inc., Palo Alto, CA (US)

(*) Notice: Subject to any disclaimer, the term of this patent is extended or adjusted under 35 U.S.C. 154(b) by 33 days.

(21) Appl. No.: 10/703,831

(22) Filed: Nov. 7, 2003

(65) Prior Publication Data

US 2004/0105580 A1    Jun. 3, 2004

Related U.S. Application Data

(60) Provisional application No. 60/428,510, filed on Nov. 22, 2002.

(51) Int. Cl.
- G06K 9/00 (2006.01)
- G06K 9/20 (2006.01)
- G06K 9/64 (2006.01)
- G01B 11/24 (2006.01)
- H04N 15/00 (2006.01)
- H04N 7/18 (2006.01)

(52) U.S. Cl. .......... 382/154; 382/278; 382/282; 356/603; 356/611; 348/47; 348/135; 345/419

(58) Field of Classification Search ............... 382/106, 382/154, 276, 278, 279, 282, 284, 294; 348/42, 348/47, 48, 50, 135, 136, 139; 356/601–611; 345/419, 421, 422

See application file for complete search history.

(56) References Cited

U.S. PATENT DOCUMENTS

| 4,175,862 | A | * | 11/1979 | DiMatteo et al. | 356/610 |
|---|---|---|---|---|---|
| 4,212,073 | A | | 7/1980 | Balasubramanian | |
| 4,349,277 | A | * | 9/1982 | Mundy et al. | 356/604 |
| 4,648,717 | A | | 3/1987 | Ross et al. | |
| 4,653,104 | A | | 3/1987 | Tamura | |
| 4,687,326 | A | | 8/1987 | Corby, Jr. | |
| 4,846,577 | A | * | 7/1989 | Grindon | 356/610 |
| 5,155,775 | A | | 10/1992 | Brown | |
| 5,307,151 | A | | 4/1994 | Hof et al. | |
| 5,615,003 | A | * | 3/1997 | Hermary et al. | 356/3.03 |

(Continued)

FOREIGN PATENT DOCUMENTS

EP    0 573 661 A1    12/1993

(Continued)

OTHER PUBLICATIONS

Lavoie et al., "3-D Object Model Recovery From 2-D Images Using Structured Light," Proc. IMTC/96, IEEE Instrum. Meas. Technol. Conf., Brussels, Belgium, 1996, pp. 377-382, IEEE.

(Continued)

*Primary Examiner*—Bhavesh M. Mehta
*Assistant Examiner*—Anthony Mackowey
(74) *Attorney, Agent, or Firm*—Carr & Ferrell LLP

(57) ABSTRACT

A system and method for acquiring three-dimensional (3-D) images of a scene. The system includes a projection device for projecting a locally unique pattern (LUP) onto a scene, and sensors for imaging the scene containing the LUP at two or more viewpoints. A computing device matches corresponding pixels in the images by using the local uniqueness of the pattern to produce a disparity map. A range map can then be generated by triangulating points in the imaged scene.

48 Claims, 5 Drawing Sheets

U.S. PATENT DOCUMENTS

| | | | |
|---|---|---|---|
| 5,621,529 | A | 4/1997 | Gordon et al. |
| 5,633,950 | A | 5/1997 | Yamaoka et al. |
| 5,699,444 | A | 12/1997 | Palm |
| 5,838,428 | A | 11/1998 | Pipitone et al. |
| 5,917,937 | A | 6/1999 | Szeliski et al. |
| 5,969,722 | A | 10/1999 | Palm |
| 6,024,449 | A | 2/2000 | Smith |
| 6,028,672 | A | 2/2000 | Geng |
| 6,118,595 | A | 9/2000 | Miller |
| 6,195,455 | B1 | 2/2001 | Mack et al. |
| 6,198,852 | B1 | 3/2001 | Anandan et al. |
| 6,205,243 | B1 | 3/2001 | Migdal et al. |
| 6,252,623 | B1 | 6/2001 | Lu et al. |
| 6,256,099 | B1 | 7/2001 | Kaufman et al. |
| 6,341,016 | B1 | 1/2002 | Malione |
| 6,356,298 | B1 * | 3/2002 | Abe et al. ............... 348/47 |
| 6,369,899 | B1 | 4/2002 | Hamada |
| 6,377,700 | B1 | 4/2002 | Mack et al. |
| 6,493,095 | B1 | 12/2002 | Song et al. |
| 6,522,777 | B1 | 2/2003 | Paulsen et al. |
| 6,542,250 | B1 | 4/2003 | Michaelis et al. |
| 6,549,288 | B1 | 4/2003 | Migdal et al. |
| 6,664,531 | B1 * | 12/2003 | Gartner et al. ......... 250/208.1 |
| 6,754,370 | B1 * | 6/2004 | Hall-Holt et al. ......... 382/106 |
| 2002/0044682 | A1 | 4/2002 | Weil et al. |
| 2002/0057832 | A1 | 5/2002 | Proesmans et al. |
| 2002/0159073 | A1 | 10/2002 | Chen et al. |
| 2002/0164066 | A1 | 11/2002 | Matsumoto |
| 2003/0002052 | A1 | 1/2003 | Hoffmann |

FOREIGN PATENT DOCUMENTS

| | | |
|---|---|---|
| JP | 58006407 | 1/1983 |
| JP | 62082314 | 4/1987 |
| JP | 3200007 | 9/1991 |
| JP | 6109450 | 4/1994 |
| JP | 6207812 | 7/1994 |

OTHER PUBLICATIONS

Naftel et al., "Acquiring Dense 3D Facial Models Using Structured-Light Assisted Stereo Correspondence," Department of Computation, UMIST, Manchester, United Kingdom, 2002, at http://www.co.umist.ac.uk/research/tech_reportstrs_2002_004_ajn.pdf.

Kang et al., "A Multibaseline Stereo System with Active Illumination and Real-Time Image Acquisition," Int'l Conf. on Computer Vision, Cambridge, MA, Jun. 1995.

Brown et al., "Advances in Computational Stereo," IEEE Transactions on Pattern Analysis and Machine Intelligence, Aug. 2003, pp. 993-1008, vol. 25, No. 8, IEEE Computer Society.

Koschan et al., "Color Stereo Vision Using Hierarchical Block Matching and Active Color Illumination," Proc. 13th Int. Conf. on Pattern Recognition ICPR'96. Vienna, Austria, Aug. 25-29, 1996, pp. 835-839, vol. I.

Niu et al., "Dense Depth Map Acquisition by Hierarchic Structured Light," Proceedings of the 2002 IEEE/RSJ Intl. Conference on Intelligent Robots and Systems, EPFL, Lausanne, Switzerland, Oct. 2002, pp. 165-171, IEEE.

Koschan et al., "Dense Depth Maps by Active Color Illumination and Image Pyramids," Advances in Computer Vision, 1997, pp. 137-148.

Ozturk et al., "Generation of Perfect Map Codes for an Active Stereo Imaging System," 22nd IEEE Annual Northeast Bioengineering Conference, Rutgers University, New Brunswick, NJ, Mar. 14-15, 1996, pp. 76-77.

Scharstein et al., "High-Accuracy Stereo Depth Maps Using Structured Light," Proc. CVPR 2003, pp. 165-171.

Salvi et al., "Pattern Codification Strategies in Structured Light Systems," Pattern Recognition, The Journal of the Pattern Recognition Society, Oct. 2, 2003, pp. 1-23, Elsevier Ltd., at http://www.elseviercomputerscience.com.

Chen et al., "Range Data Acquisition Using Color Structured Lighting and Stereo Vision," Image and Vision Computing, 1997, pp. 445-456, vol. 15, Elsevier Science B.V.

Caspi et al., "Range Imaging With Adaptive Color Structured Light," IEEE Transactions On Pattern Analysis and Machine Intelligence, May 1998, pp. 470-480, vol. 20, No. 5, IEEE.

Zhang et al., "Rapid Shape Acquisition Using Color Structured Light and Multi-Pass Dynamic Programming," International Conference on Computational Science, 2002.

Batlle et al., "Recent Progress in Coded Structured Light as a Technique to Solve the Correspondence Problem: A Survey," Pattern Recognition, 1998, pp. 963-982, vol. 31,No. 7, Elsevier Science Ltd., Great Britain.

Davis et al., "Spacetime Stereo: A Unifying Framework for Depth from Triangulation," Proc. CVPR 2003.

Morano et al., "Structured Light Using Pseudorandom Codes," IEEE Transactions on Pattern Analysis and Machine Intelligence, Mar. 1998, vol. 20, No. 3, IEEE.

Blake et al., "Trinocular Active Range-Sensing," IEEE Transactions on Pattern Analysis and Machine Intelligence, May 1993, vol. 15, No. 5, IEEE.

Pulli, "Surface Reconstruction and Display from Range and Color Data," 1997, unpublished Ph.D. dissertation, University of Washington.

* cited by examiner

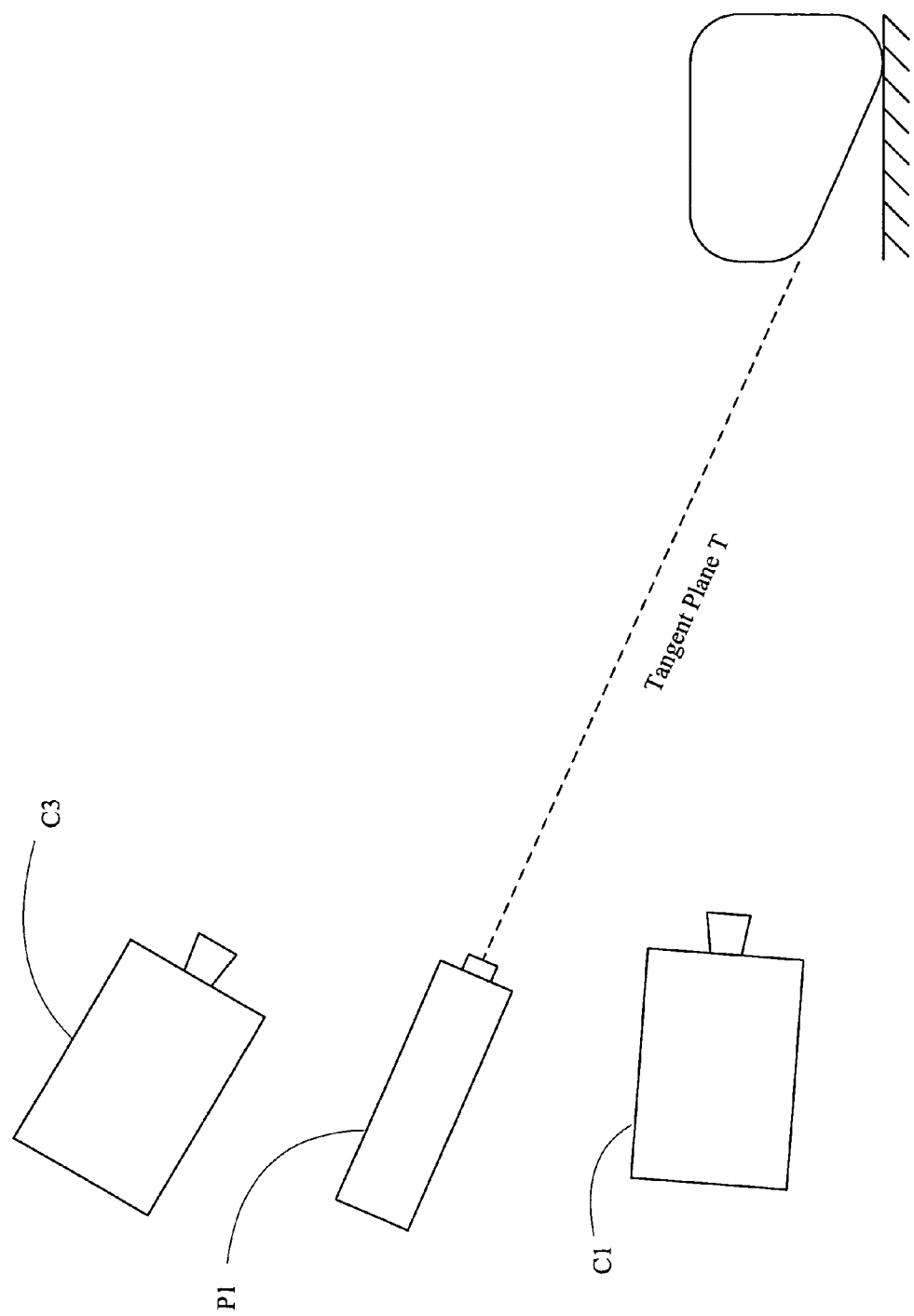

ACQUISITION OF THREE-DIMENSIONAL IMAGES BY AN ACTIVE STEREO TECHNIQUE USING LOCALLY UNIQUE PATTERNS

CROSS-REFERENCE TO RELATED APPLICATION

This application claims the benefit of commonly owned U.S. provisional patent application Ser. No. 60/428,510, entitled "Acquisition and Processing of a Scene Image By Active Stereo Using Locally Unique Patterns", filed Nov. 22, 2002, which is incorporated herein by reference.

BACKGROUND

1. Field of the Invention

The present invention relates generally to systems and methods for acquiring three-dimensional images, and more particularly to systems and methods for acquiring three-dimensional images by stereo techniques.

2. Description of the Prior Art

The use of 3-D imaging systems plays an increasingly important role in applications such as computer graphics, medical imaging, and automated manufacturing and inspection. To acquire a 3-D image, it is necessary to determine the distance or range to points in a scene (a region to be imaged, typically containing one or more objects). While the specific requirements of 3-D imaging systems will depend in part on the application for which it is used, desirable characteristics and properties of a 3-D imaging system common to many applications include the ability to generate dense, highly accurate range maps, rapid image acquisition, robustness to variations of surface properties and illumination, and precise correlation of range with spectral information.

References in the art disclose disparate approaches to acquiring 3-D images within a scene. These approaches may be broadly categorized into two types: passive and active. Passive 3-D imaging techniques do not require the introduction of additional radiant energy into the imaged scene. A first group of passive techniques utilizes multiple cameras, each camera capturing an image of the scene from a unique viewpoint. The resultant images are analyzed by feature-based or area-based matching methods. The foregoing group of passive techniques has the disadvantage of producing inaccuracies and/or dropouts in the range map corresponding to areas of the scene where there is little texture or inadequate illumination. Another group of passive techniques involves imaging the scene from multiple focal lengths and identifying, for each point, the focal length producing the sharpest focus. The range to the point can then be calculated utilizing the monotonic relationship between range and focal length. This group of techniques (deemed "range-to-focus" techniques) suffers from the aforementioned problem of dropouts/low accuracy in the range map associated with areas of little texture or inadequate illumination; furthermore, range-to-focus techniques are slow due to the number of images that must be captured.

Active 3-D imaging techniques are based on the introduction of additional radiant energy into the imaged scene. Active 3-D imaging techniques may be organized into three groups: time-of-flight, single-camera, and multiple-camera. Time-of-flight techniques measure (typically by direct timing or phase shift) the time required for light to travel from a source to a point in the scene and thereafter to a detector. These techniques require long acquisition times (because they require scanning of the light source over objects in the scene), utilize expensive equipment, and exhibit difficulty in correlating measured range with spectral data. Single-camera techniques involve the projection of structured light onto points in a scene imaged by the single camera. The source of the projected light provides one of the positions used for calculating range by triangulation, and the structure of the light identifies the particular projection point. Examples of such techniques include those described in U.S. Pat. No. 5,838,428 to Pipitone et al., System and Method for. High Resolution Range Imaging with Split Light Source and Pattern Mask, and in U.S. Pat. No. 4,648,717 to Ross et al., Method of Three-Dimensional Measurement with Few Projected Patterns. The projected light may take one of three forms: a single dot or plane sequentially scanned over the scene; a grid of lines, or; a spatially coded pattern. While the single camera techniques may produce useful results in applications where background lighting can be carefully controlled, they suffer from lack of robustness (resulting in dropouts or regions of low accuracy) in the absence of controlled background lighting.

Active multiple-camera techniques are similar to the passive multiple-camera techniques outlined above, with the addition of a projected structured light pattern onto the scene to assist in matching corresponding pixels in the plural images. A commonly used active multiple-camera technique (described, for example in Morano et al., Structured Light Using Pseudorandom Codes) uses projection of randomly generated light patterns. A problem with the use of random patterns is that large match windows (the use of which tends to miss or distort details of imaged surfaces) are required to ensure that accurate correspondences are computed. Further, the randomized nature of the light pattern means that its properties cannot be guaranteed, leading to matching failures and consequent dropouts.

Another group of active multi-camera techniques employs light patterns having spatially varying wavelengths. In accordance with these techniques, the light incident on a point within a scene has a spectral composition different from its neighboring points, which assists in identifying corresponding points in the plural images. Examples of techniques of this general description include those described in U.S. Pat. No. 5,621,529 to Gordon et al., Apparatus and Method for Projecting Laser Pattern with Reduced Speckle Noise, and in U.S. Pat. No. 6,493,095 to Song et al., Optional 3D Digitizer, System and Method for Digitizing an Object. However, the degree of assistance to the matching process provided by projection of this type of light pattern is limited due to the similarity of the light projected on adjacent pixels. In addition, regions having rapid variation in illumination or surface albedo create additional ambiguity in the matching process. Taken together, these limitations work to create regions in which the matching fails, resulting in dropouts.

In view of the foregoing discussion, there is a need for a 3-D image acquisition system that that overcomes the problems or deficiencies associated with existing techniques.

SUMMARY OF THE INVENTION

Generally described, a system for obtaining a disparity map of a scene according to an embodiment of the present invention includes one or more sources of radiant energy for projecting a locally unique pattern onto at least a portion of the scene, sensors for acquiring images of the scene from multiple viewing positions, and a computing device configured to generate a disparity map by matching corresponding pixels in the images. The disparity map may subsequently be utilized to compute the range to points in the imaged scene by triangulation, thereby generating a range map.

A novel and advantageous aspect of the present system is the use of one or more locally unique patterns (LUPs), which are projected patterns chosen so that a pixel in an image acquired in one of the viewing positions has a unique match in the image at each of the other viewing positions. Because there is a unique match between pixels in the different images, range to points in the scene can be computed accurately and without dropouts caused by unmatched or incorrectly matched areas. According to various implementations described in further detail herein, a locally unique pattern may take the form of a binary pattern, wherein the pattern is constructed from a two-value pattern alphabet, or a sine wave pattern, wherein the pattern is constructed from pattern values representing a discretized continuous sine function. Selection of an optimized LUP from a set of candidate LUPs may be accomplished by a direct scoring method, or by a simulated imaging scoring method. LUP selection may also be based on disparity maps computed for images acquired with previously-projected LUPs.

In accordance with certain implementations of the invention, the image sensors take the form of three cameras each having a unique viewing position. A disparity map may then be computed simultaneously from all three images, or by producing two pairwise disparity maps and combining the two pairwise disparity maps to form a composite disparity map. Two of the cameras and the projection device in the three-camera system may be beneficially arranged in an aligned, vertically spaced relation to minimize range shadows in typical scenes.

A unique aspect of the present invention is that it is not necessary to actually recover the projected pattern to produce the range map. This aspect is in contradistinction to techniques employing projected structured light with a single camera. In systems configured in accordance with the invention, where the background illumination provides location-to-location differences, these differences contribute to differences in the images in the match windows. Moreover, where object surface characteristics provide location-to-location differences, these differences contribute to differences in the images match windows.

The system uses a projected pattern with sufficient intensity that its reflection from the surface is a significant component of the total intensity. Hence, the location-to-location differences contributed to the image by pattern differences suffice to distinguish match windows. If for all pairs of match windows, the projected patterns are always different, then the images will be different and the matching will be unique.

BRIEF DESCRIPTION OF THE DRAWINGS

In the attached drawings:

FIG. 5 is a symbolic diagram depicting how the FIG. 4 arrangement of cameras and projector minimizes the occurrence of range shadows.

DETAILED DESCRIPTION

In order to create 3-D images, intensity images of a scene illuminated with projected patterns are acquired by two or more sensing devices each having a unique viewing position. A matching process is performed on the images, and the resulting matched pixels are used to determine range to points in the scene. The projected patterns are designed to enhance the fidelity of the matching process. More specifically, the invention makes use of projection patterns that are locally unique. For the purposes of describing the invention, a pattern is taken to be some spatially organized group of pattern values. A pattern window is a portion of a pattern. A locally unique pattern (LUP) is a pattern wherein every pattern window of some minimum fixed size and/or shape appears only once within some specified neighborhood of fixed size and/or shape of the overall pattern. The specific choice of LUP used by the invention depends on the imaging circumstances, the geometric and dynamic properties of the scene, the size of features to be resolved, and the computational budget, as further detailed below.

Figure 1:
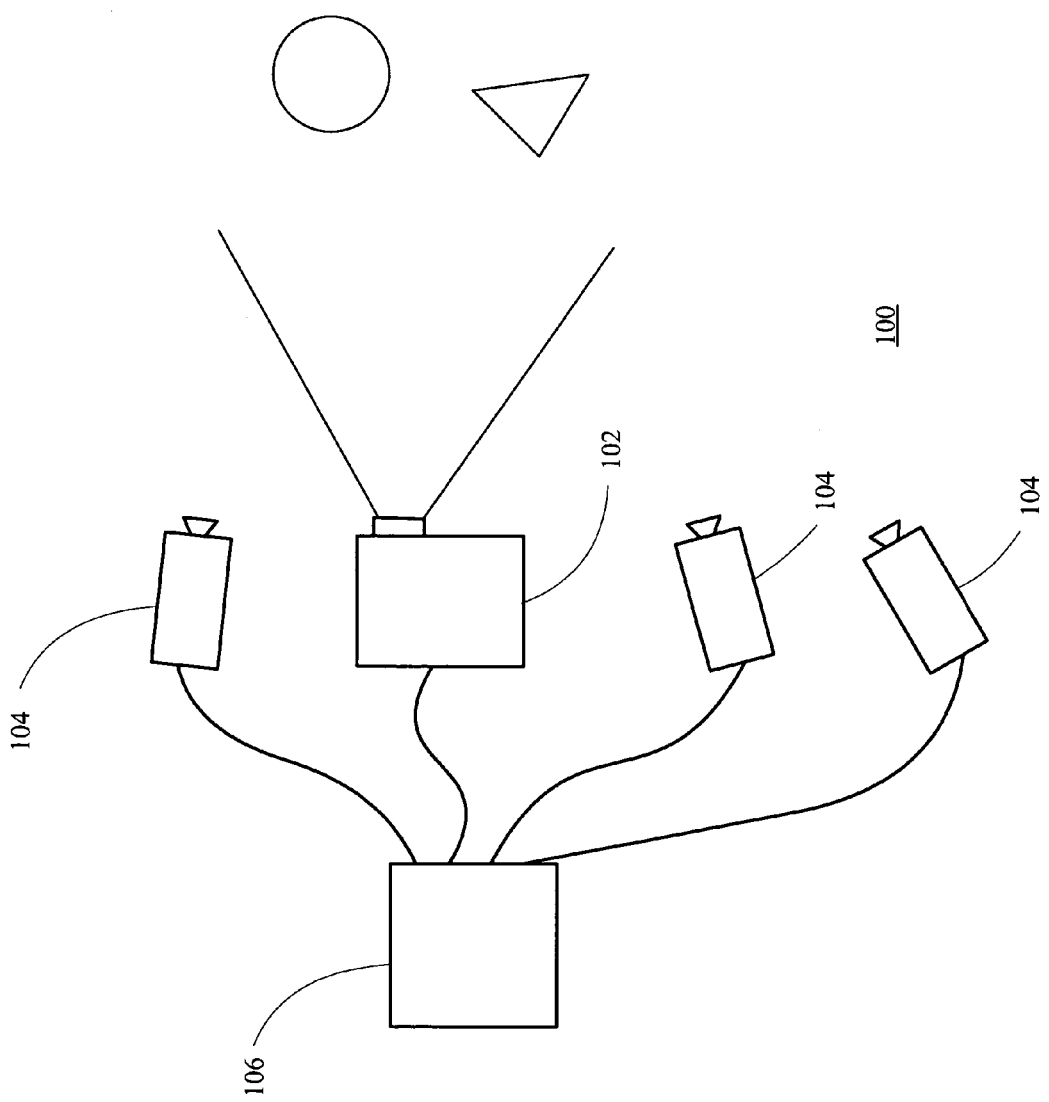
FIG. 1 is a symbolic diagram depicting the primary components of a three-dimensional image acquisition system, in accordance with an embodiment of the present invention.

FIG. 1 shows the principal physical components of a 3-D image acquisition system 100 configured in accordance with an embodiment of the invention. A projection device 102 projects LUPs onto a scene to be imaged. A set of sensors, which may take the form of cameras (individually and collectively denoted as 104), acquire images of the scene from a plurality of unique viewing positions. A computing device 106 receives images from cameras 104 in electronically encoded form and executes instructions for performing matching on windows of multi-band images within a search area to compute matching pixels in the images and thereby generate a disparity map. Computing device 106 may be coupled to cameras 104 and projection device 102 via a USB, IEEE-1394, or other suitable interface. Computing device 106 also implements a triangulation algorithm for computing the range from said images to points in the scene using the disparity map produced by the pixel matching process. Methods for realizing both the matching and range-computation functions are described in standard textbooks on computer vision, and would be familiar to one of ordinary skill in the art.

In an exemplary implementation of system 100, cameras 104 take the form of three digital cameras such as the Sony DFW-SX900, which is a color camera that has a resolution of 960 by 1280 pixels and acquires images in YUV format. Projection device 102 is a computer-controlled LCD projector such as the Hitachi CP-X270, which projects color images with a maximum resolution of 768 by 1024 pixels. Computing device 106 is a DELL Dimension 8200 computer running the Windows 2000 operating system.

In some cases, the LUP to be projected may consist of multiple pattern layers or bands. In these cases, the images sensed by cameras 104 normally contain the same number of bands—that is, there is normally one acquired image band for every projected image band. These bands may be sensed during a single acquisition cycle using, for example, separate color bands, or may be sensed temporally by sequentially projecting and acquiring each band, or they may be sensed through any combination of color and temporal bands.

The images acquired from the cameras 104 contain images of the surfaces of objects in the scene visible to each camera. In these images, surfaces that are also illuminated by the projection device will exhibit the LUP. Furthermore, as will be disclosed below, knowledge of the arrangement of the cameras and projection devices makes it possible to determine the size that a given pattern window will appear in the images. A primary aspect of the present invention is to create patterns for which a specific size and shape of pattern window is locally unique over a sufficiently large neighborhood to guarantee that appropriately sized matching windows in sensed images are likewise unique over a corresponding neighborhood in the sensed image.

Image acquisition may be done by a variety of sensors, including cameras 104 described above. In the following discussion, the term "camera" will be used to generically represent such devices. In addition, a camera has an identifiable position, usually taken to be its optical center. The terms viewing position, camera location, and camera will be thus identified with one another.

Figure 2:
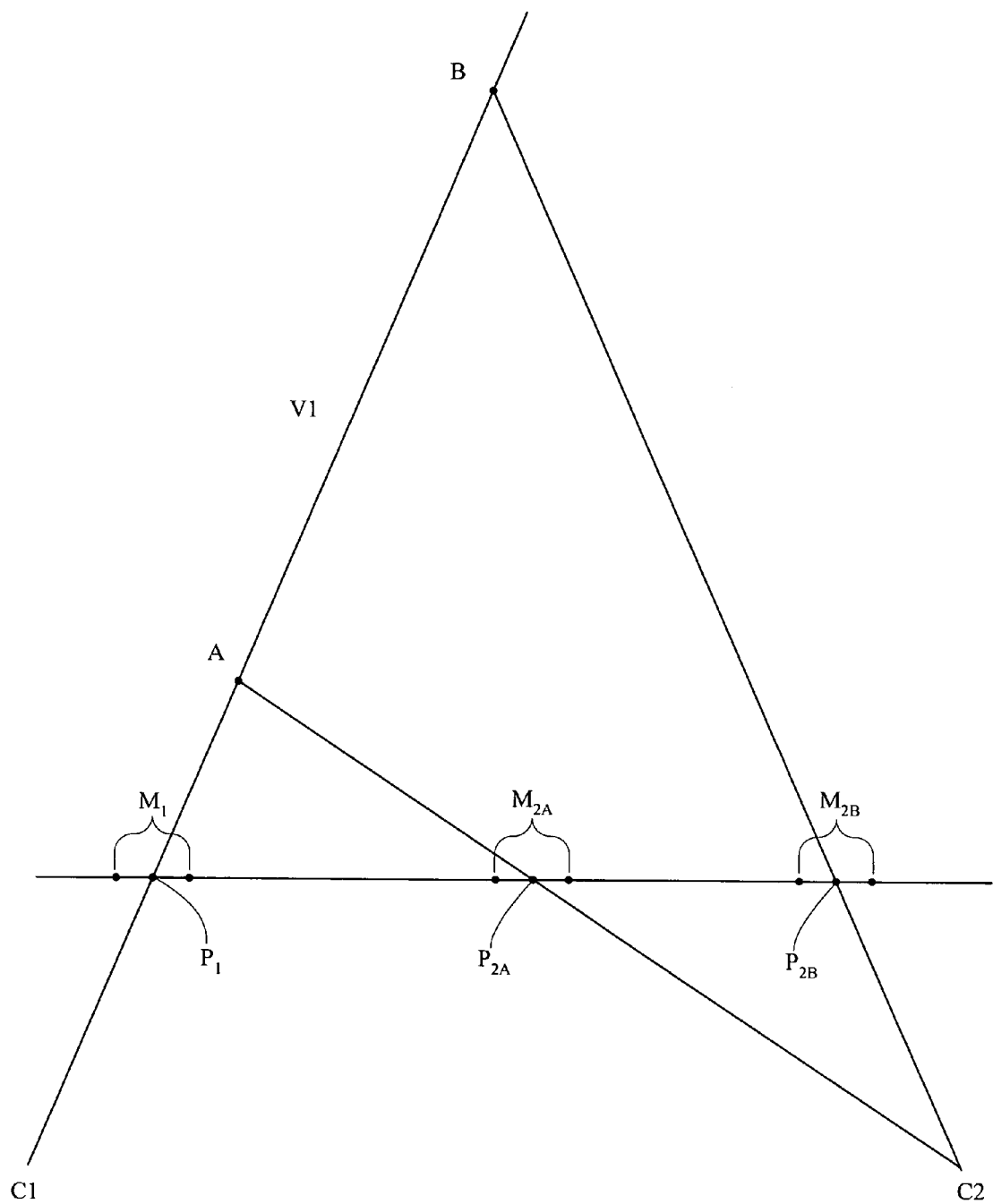
FIG. 2 is a ray diagram illustrating match windows lying along an epipolar line.

Although the invention can make use of three or more cameras, it is useful to first explicate the basic principles in reference to single pair of cameras referred to below and depicted in FIG. 2 as C1 and C2. Given such a pair of cameras, one goal of the present invention is to produce a map of pixel locations in the two camera images that match one another. The resulting set of matching locations is termed a disparity map.

Pixel matching is typically accomplished by considering a spatial region surrounding a pixel location, known as a "match window". This match window is taken to extend over all bands of the image in question. FIG. 2 illustrates an example of matching showing two viewing positions respectively corresponding to cameras C1 and C2. For the purposes of exposition, the match window associated with camera C1, is considered fixed. Pixel location P1 in the image of camera C1 is to be matched to some pixel location in the image of the other camera, C2. For matching, a match window M1 surrounding P1 is considered. By definition, any two points along a viewing ray of camera C1 project onto the same pixel location in C1's image. FIG. 2 shows a viewing ray V1 and two such points, A and B. Points A and B project onto different pixel locations in the second image, shown as P2a and P2b. The corresponding match windows in the second images are shown as M2a and M2b. In principle, it would be possible to choose any point along the viewing ray V1, but for the intended applications, it is sufficient to consider only those points within a certain depth range called the "designed working range".

The line in an image along which potential corresponding pixel locations lie is referred to in the art as an "epipolar line." For the purposes of exposition, the term "epipolar band" will be taken to represent a collection of pixels containing one or more epipolar lines and extending over all image bands.

Although not essential for the present invention, it is common to resample the sensed images so that pixels along an epipolar line fall along a row or column of the resulting image, a technique referred to in the art as image rectification. In the case of images composed of multiple bands, this operation is performed identically on each image band. Techniques for producing rectified images from stereo camera pairs are described standard textbooks on computer vision, and would be familiar to one of ordinary skill in the art.

Several values characterizing the cameras and their position in space relative to one another are required in order to perform image rectification, and in order to realize other aspects of the invention as is disclosed below. These values include: 1) B, the baseline distance between the optical centers of the cameras, and 2) F, the internal scaling factor between image coordinate values and metric coordinate values for an equivalent unit focal length sensing system. These parameters are acquired through a calibration process that would be familiar to one of ordinary skill in the art.

Given a designed working range in the scene, $R_{min}$ to $R_{max}$, a baseline distance between camera images B, and a scaling factor F, the number, L, of possible matching pixel locations between two rectified images can be computed as $$L = B*F/R_{min} - B*F/R_{max}$$

For example, in the implementation described above, the baseline of two of the cameras is 189 mm. The internal scaling factor is 2700. The working range of the system was chosen to be from 1250 mm to 2150 mm. Under these conditions, L=174, i.e., there are at most 174 possible matching pixel locations.

During the matching process, $M_1$ is compared with L match windows in the second image. $M_{2a}$ and $M_{2b}$ in FIG. 2 are two such match windows. A unique match can be guaranteed provided that any two points within the designed working range of the system that lie along a viewing ray of one camera have unique values for their match window in the other camera. In the example of FIG. 2, this corresponds to saying that for all $L*(L-1)$ distinct choices of $M_{2a}$ and $M_{2b}$, the values in $M_{2a}$ and $M_{2b}$ are different. Systems utilizing the approach encompassed in the present invention project a pattern chosen to create such unique image values.

Although not essential for the present invention, it is useful to view the LUP as consisting of rows and columns of values, and the projection device arranged such that the rows of the pattern correspond to epipolar bands of a pair of rectified images. For example, in the implementation described above, projection device 102 may be arranged so that rows of the projected image are parallel to the rows of the rectified images from one pair of cameras 104. One of ordinary skill in the art will realize that there are many equivalent ways of aligning projection devices and cameras to achieve this result.

In the preferred embodiment, LUPs are created by first computing a base pattern that will fall along an epipolar band. A "base pattern" has the property that any pattern window within it of a specified size and shape is distinguishable from all other such pattern windows. This condition is taken to include cases where the base pattern is wrapped cyclically around itself. This base pattern is then replicated, as is described in detail below, to produce the LUP.

A key aspect of the present invention is to ensure the aforementioned uniqueness of match windows. That is, it is essential that every match window subtend a large enough area of the image to ensure it contains a pattern window of sufficient size to ensure local uniqueness, and at the same time ensure that the pattern is sampled finely enough to represent it adequately in images. Both of these constraints can be satisfied by determining the relationship between the area subtended by a pattern window as projected by the projection device, and that subtended by the pattern in the sensed image. In particular, the sampling constraint implies that there are a sufficient number of sensing elements in the area subtended by the pattern window in the sensed image to accurately represent it, no matter how small that area becomes. At the same time, the match window must be large enough to encompass the area subtended by the pattern window in the sensed image, no matter how large the pattern occurs.

Figure 3:
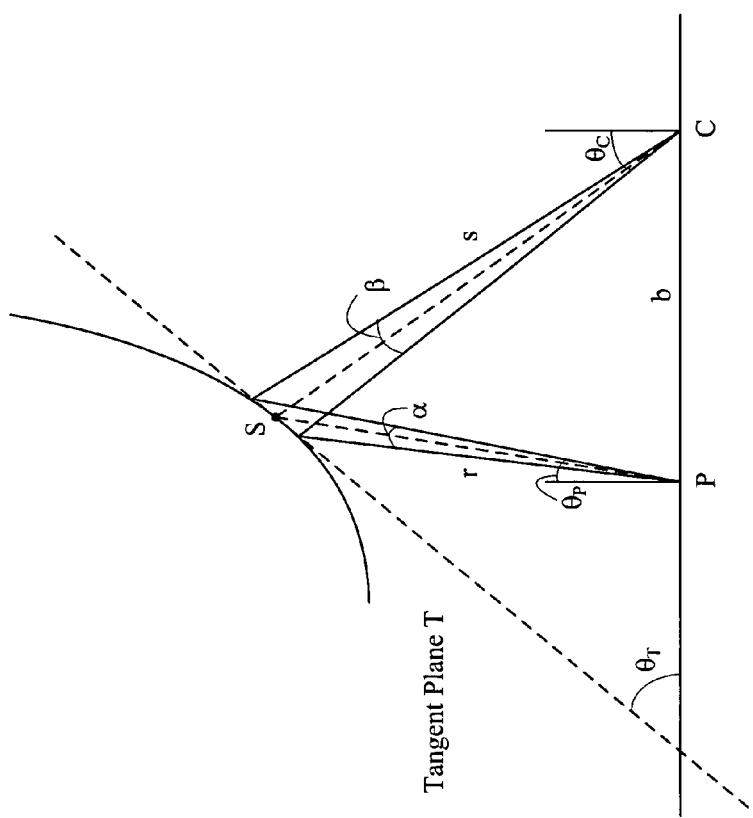
FIG. 3 is a ray diagram illustrating the relationship between the area subtended by a pattern window and the area subtended in the sensed image.

FIG. 3 shows the situation to consider in a given two-dimensional epipolar plane. The figure shows a projection device located at point P, a camera located at point C, and a point on a surface, S, that has tangent plane T. The baseline may be defined to be the line joining P and C. $\theta_T$ is the angle between the baseline and T. The values r and b respectively denote the distance from P to S and the distance from P to C. Let $\theta_P$ be the angle formed between PS and the normal to PC. Likewise, let $\theta_C$ denote the angle formed by CS and the normal to PC. Let s denote the distance from C to S.

The foreshortening effects due to projection within the projection device and the cameras are taken to be inconsequential. As a result, we consider the angles subtended by the projected and image pattern window. More specifically, suppose the projected pattern window subtends a small angle a centered about the line PS. It follows that, to first order, the pattern window appears on the surface with size $W \cong \alpha r/\cos(\theta_T - \theta_P)$ We also know that $W \cong \beta s/\cos(\theta_T - \theta_C)$ Where $\beta$ is the angle subtended by the projection of the pattern window in the observing camera image. It therefore follows that $\alpha r/\cos(\theta_T - \theta_P) = \beta s/\cos(\theta_T - \theta_C)$ equivalently, $\beta/\alpha = r/s \, \cos(\theta_T - \theta_C)/\cos(\theta_T - \theta_P)$ In the exemplary embodiment, the method of computing the minimum and maximum ratio of beta/alpha is to consider a fine grid of points within the working range, and to compute the minimum and maximum ratio over that grid. The grid is chosen to be the set of points within the working range of 1250 mm to 2150 mm, and over a range of angles of +/−12 degrees about the projector axis. This range of angles meets or exceeds the range of angles over which the LUP is projected. In the preferred embodiment, the worst-case baseline distance between the projector and the camera is bounded by the distance between the camera pair, which is 189 mm in the exemplary implementation described above. The maximum surface angle for which disparity is to be computed is taken to be 60 degrees from frontal, a value that is sufficient to allow convex objects be modeled using no more than 3 views. With this information, the minimum and maximum ratio of beta to alpha is found to range from 0.88 to 1.13.

Thus, for the specific implementation described above, adequate sampling is ensured by arranging the resolution of the projector and the resolution of the camera system to ensure that every 2 by 2 region of camera pixels image no more than 0.88 by 0.88 projected pixels. That is, any projected set of values will appear to be magnified by a factor of at least 2/0.88=2.27. To ensure that any match window will contain a pattern window of size m by n, match window sizes must be further increased by a factor of 1.13, or a total magnification factor of 2*1.13/0.88=2.6, giving a match window size of r by p with r=2.6*m and p=2.6*n. One of ordinary skill in the art will realize that the appropriate factor by which to increase match window size is a function of the design parameters of the system. Likewise, one of ordinary skill in the art will appreciate that the system can be operated with match windows of smaller size, although it will not be possible to provide guarantees on match window uniqueness. Finally, one of ordinary skill in the art will also understand that the system may be operated with match windows of size larger than the stated minimum.

Since the cameras and projection system now bear a known relationship to each other, it is possible to determine the necessary size of the base pattern from the value L computed above. In particular, match uniqueness of adequately sized match windows can be ensured by creating a pattern image composed of a cyclic, non-repeating base pattern that will span at least 174 columns of any camera image when acquired. Based on the configuration of the projection device as disclosed above, if we consider a base pattern of length L/2=87 columns, we see that it appears in camera images with a size of LC=f*2.27*87=f*2*87/0.88, where f is the foreshortening ratio which is in the range of 0.88 to 1.13. Thus, LC meets or exceeds the requirement of spanning 174 columns in any camera image.

It remains to choose the structure of the elements of the pattern, the desired match window size and the number of bands in the pattern image. These values depend on the application in question. The robustness of matching typically grows with increasing size of match window size and increasing number of image bands. However, the spatial resolution achievable in disparity maps is inversely proportional to the match window size, and thus improves with smaller windows. Increasing the number of image bands increases the complexity of image acquisition and may impact image quality. For example, situations where scenes are dynamic (i.e., where objects are in motion) make it difficult to acquire multiple bands by sequential projection. Scenes where there are highly saturated colors make it difficult to acquire patterns through color-coding. Finally, increasing the number of pattern values decreases match window size and the required number of bands, but places stronger requirements on the signal to noise ratio of the sensed images to ensure match reliability.

As a result, there may be many LUPs for a given system configuration, each with particular advantages and disadvantages. Thus, in generating patterns, it is useful to be able to "score" them to choose the best. The embodiment of the invention has made use of patterns scored in one of two ways.

The first method is to score a candidate pattern directly. For example, for binary patterns, a common measure of similarity is the Hamming distance, defined as the number of positions in which two strings of bits differ. If one considers all possible pattern windows in a binary pattern, then one can score the binary pattern by computing the minimum Hamming distance over all pairs of distinct pattern windows. In particular, if the score is zero, then a pattern window is repeated somewhere in the string. The larger the score, the more difference there is among pattern windows, and hence the more robust the resulting pattern is likely to be to unforeseen disturbances. This scoring method is henceforth referred to as the "Hamming scoring method." In the special case where the Hamming distance is 1, it is possible to efficiently generate LUPs using well-known graph traversal algorithms. Such strings are known as Debruijn sequences. In the preferred embodiment, Debruijn sequences are generated with the modification that strings consisting entirely of 0's or 1's are disallowed.

A second method of scoring patterns includes the effects of projecting and imaging the pattern. In particular, this method is well-suited for patterns composed of continuous functions. In this case, the score is computed by first creating the base pattern, then simulating the projection and sensing it as a set of discrete image pixels. The resulting array of values can now be processed much as the binary pattern previously discussed. That is, a set of match windows can now be defined. When defining these match windows, it is additionally useful to take into account the fact that the two sensing elements may sample the pattern differently; in the worst case, they will sample it with an offset of ½ pixel. The desirable property of the pattern is that even under these circumstances, the closest match (that is, a match window compared to itself offset by ½ pixel) has a higher match score than any other possible match. Following this line of reasoning, the score for a given pattern window is the lowest value of its match score against itself minus the largest match score against any other distinct match window. The score for the entire base pattern is the minimum of this value for all match windows. A base pattern that has a positive score is thus locally unique, and those with larger scores are more likely to be robust against sampling errors. This scoring method is defined herein as the "simulated imaging scoring method."

Hence, depending on the requirements of the application, one chooses the match window size and shape, the number of image bands, the base pattern length, and the base pattern scoring function. Having fixed all such choices, the specific embodiment uses the following algorithm to generate base patterns:

1. Generate a candidate base pattern string P; if no more candidates remain, return the best found so far.
2. Compute the pattern score, S, for P when viewed as a cyclic pattern.
3. If S is larger than all previous scores, record P as the best candidate.
4. Go to 1.

The specific embodiment makes use of two classes of patterns: 1) binary patterns, and 2) sine wave patterns. Binary sequences are most useful in difficult imaging circumstances (where high signal to noise ratio is desirable) or in cases where the projection device itself is binary. Examples of the former are scenes that contain surfaces with a very large range of albedos. An example of the latter is an illumination device driven by a laser source configured to provide a spatial grid of points.

Sine waves are composed of a continuous range of values and thus produce more spatially compact patterns. They are therefore most suitable when high spatial resolution is required. By appropriately bounding the highest frequency present in the pattern, it is also possible to control sampling artifacts in the sensed images.

Sine wave patterns are computed using the simulated imaging scoring method, wherein pairs of simulated match windows are scored using normalized cross-correlation on multi-band images. Specifically, for candidate match window M1 and M2 extending across m rows, n columns, and b bands, the normalized cross correlation is defined as follows. First, the mean of all m*n*b pixel values in M1 is subtracted from each pixel value in M1; the same operation is done for M2. Following this step, the square root of the variance over all m*n*b pixel values in M1 is computed and each pixel value is divided by the window variance; the same is done for M2. Finally, the correlation, defined as the mean of the pairwise product of all m*n*b corresponding pixel values in the zero-mean, variance normalized match windows M1 and M2 is computed. This value, which ranges from −1 to 1, is the normalized cross-correlation for the match windows M1 and M2.

Candidate strings are generated by sampling the frequency and phase space of three sin functions with periods between 4 and 11 pixels. The specific base pattern produced for the preferred embodiment consists of three sine waves with periods of 4.2, 9.5 and 10.2 pixels, and phase shifts of 0, 1, and 5.5 pixels, respectively, sampled to produce a discrete base pattern of length 140. This base pattern is used to construct a three-band pattern image. This pattern is subsequently referred to as the Sin4-9-10pattern. For the configuration of the specific embodiment described above, the Sin4-9-10 pattern has the property that match windows of size 1 row by 7 pixels by 3 bands produce a positive match score. Furthermore, the match score increases with the length of the match window. The compactness of the required match window makes the Sin4-9-10 pattern useful in situations where high disparity resolution is required.

This base pattern has a length of 140 and can be represented using either three rows of the pattern image, or one row in each of three bands. The specific embodiment represents the Sin4-9-10 pattern using three bands. Consequently, the pattern in each band is one row high.

Embodiments of the invention may also make use of discrete sequences that are rendered as binary patterns. One such binary pattern has been generated by scoring the string using the Hamming (direct) scoring method described above. Candidate strings are generated by initially creating a set of short base patterns, and then subsequently adding elements to those that have a promising pattern score until the desired length is reached. The resulting pattern has a minimum Hamming distance of three. It consists of two binary strings. The first string is: 1011110011010110111 00001011000100011000110111100001111111011001001 000010000011001101101101000010010101001010100011 1111101011100111100101111001110

The second is: 00100101110011010101001111010010000 01010000111111000011111010100011010101101100011100 110000101110101011110111000011010011111011111001 1100001000110

This base pattern has a length of 146 and can be represented using either two rows of the pattern image, or one row in each of two bands. The specific embodiment described hereinbelow represents the pattern using two rows.

In the resulting base pattern, every 2 row by 8 column pattern window differs in at least three places (i.e. has a Hamming distance of 3) from any other similarly sized pattern window, including pattern windows that begin at the end of the base pattern and "wrap" to the front (i.e. the pattern is viewed as being cyclic). This pattern is subsequently referred to as the Bin2×8 pattern.

In the preferred embodiment, base patterns are placed into epipolar bands composed of one or more bands and/or one or more rows. Since the base patterns are generated while ensuring uniqueness as a cyclic pattern, it is possible to concatenate them and preserve the desired uniqueness property of match windows for the prescribed range of locations along an epipolar band. This process allows the following algorithm to be used to create LUPs from base patterns:

1. Let m be the number of rows in a base pattern and let n be the number of columns. Let M be the number of rows in the final projection image, and let N be the number of columns.
2. Create a new base pattern P* by concatenating ceiling (N/n) copies of the original base pattern; truncate the resulting string so that is it now of size m by N.

3. Stack ceiling(M/m) copies of P*, then truncate the result at the Mth row.

An LUP so created will be referred to as a "straight LUP."

For the specific embodiment disclosed above, when performing matching to compute disparity maps, the size of the match window is the size of the pattern window multiplied by the factor 2.6 rounded to the nearest odd integer. Thus, for the Bin2×8 pattern, the match window size is chosen to be 5 by 21. With this, the algorithm for computing a disparity map for a straight LUP based on the Bin2×8 pattern using a single band pattern image then proceeds as follows:

1. Matching from windows in the C1 camera image to windows in the C2 camera image is performed using a match window size of at least 5 by 21. Matches that fall below a correlation threshold of 0.5 and a local variance threshold of $10^{-6}$ are discarded and their correlation score is set to zero.
2. Optionally, matching from the C2 camera image to the C1 camera image is performed using the same window size. Disparities that do not agree within 2 disparity values in C1-C2 and C2-C1 matches are discarded and their correlation score is set to zero.

Note that it is possible to perform just step 1 to create a disparity map, if desired.

The process described above for creating LUPs has the advantage that, by placing the LUP into multiple bands, it is possible to create pattern windows that are as small as one pixel high. This property provides for computational efficiency and also provides high spatial resolution of features in the direction orthogonal to the epipolar bands in the image. In particular, straight LUP patterns that are one row high have the same value in all elements of a column. Hence, the pattern image in a 1 by p match window has the same effective content as that imaged into a larger r by p match window. Hence, match windows in camera images can also be only one row high.

However, it is not possible to provide comparable resolution of features along epipolar bands, since the match window width is much larger than the window height for the given base pattern.

In cases where additional resolution along epipolar bands is required, the preferred embodiment allows the base pattern to be offset by a fixed amount along the epipolar bands as the LUP is produced. This allows the match window to span either multiple rows or multiple columns, or both, while maintaining the necessary uniqueness properties. Specifically, the preferred embodiment makes use of LUPs created by the following algorithm:

1. Let m be the number of rows in a base pattern, n be the number of columns. Let M be the number of rows in the final projection image, and let N be the number of columns.
2. Create a new base pattern P* by concatenating ceiling (N/n) copies of the original base pattern.
3. For i=1 to ceiling(M/m)
    a. Set rows (i−1)*m+1 to i*m of the pattern to be projected to P* shifted cyclically left by (i−1)*m positions.
4. Truncate the result to be of size M by N.

The result of this algorithm is that the base pattern now "rolls", producing a texture oriented at a 45-degree angle in the LUP. Such an LUP will be referred to as a "rolled" LUP. In particular, when using a rolled LUP, if a pattern window of 1 by n is unique for L locations along a row, a pattern window of size n by 1 is also unique for L locations along a row. An n by 1 pattern window is also unique for L locations along a column, as is the original 1 by n window. In short, it is possible to use pattern windows in transposed form, and to use them along both rows and columns. For a 2 by n pattern, the corresponding transposed window size is calculated as follows. Let n' be the first multiple of 2 larger than or equal to n. Then the corresponding pattern window size in n'+1 by m. For example, the Bin2×8 base pattern would have a transposed window size of 9 by 2 when used in a rolled LUP. One of ordinary skill in the art will realize it is possible to perform similar calculations to determine window sizes for rolled patterns created from base patterns with more than 2 rows.

Given a rolled LUP, it is now possible to make use of windows of varying shapes and sizes, provided the window is of sufficient size to ensure a unique match. In particular, the specific embodiment described above uses the sin-4-9-10 pattern as the base pattern for a rolled LUP. The window size necessary to ensure match uniqueness of the 1 by 7 match window used to evaluate the pattern must be expanded to at least 1 by 7*1.13/0.88=1 by 9 to account for the foreshortening effects. As a result, the following algorithm is used to compute a disparity map for a rolled sin4-9-10 LUP:

1. Matching from windows in the C1 camera image to windows in the C2 camera image is performed using a window size of at least 1 by 9. Matches that fall below a correlation threshold of 0.5 and a local variance threshold of $10^{-6}$ are discarded and their correlation score is set to zero.
2. Optionally, matching from the C2 image to the C1 camera image is performed using the same window size. Disparities that do not agree within 3 disparity values in both C1-C2 and C2-C1 matches are discarded and their correlation score is set to zero.
3. The result of steps 1 and 2 is called the wide disparity match.
4. Matching from windows in the C1 camera image to windows in the C2 camera image is performed using a window size of at least 9 by 1. Matches that fall below a correlation threshold of 0.5 and a variance threshold of $10^{-6}$ are discarded and their correlation score is set to zero.
5. Optionally, matching from the C2 camera image to the C1 camera image is performed using the same window size. Disparities that do not agree within 3 disparity values in both C1-C2 and C2-C1 matches are discarded and their correlation score is set to zero.
6. The results of steps 4 and 5 are called the tall disparity match.
7. The correlation values of the wide disparity match and the tall disparity match are compared; the disparity values with the highest correlation score are retained.
8. In areas where only one of the wide disparity match or tall disparity match is able to compute a disparity, that disparity is retained.

Note that it is possible to perform just steps 1–3, just steps 4–6 or all of steps 1–8 to create a disparity map.

Following disparity map generation, the preferred embodiment optionally performs a second pass of disparity calculation whereby small areas of pixels where disparities were not calculated using the algorithm above are inferred from neighboring disparities, and subsequently scored using normalized cross correlation. Those values that are scored above a threshold of 0.5 are retained as valid disparities.

Following this disparity map computation, disparity values are optionally refined to subpixel accuracy using local optimization techniques. Methods for implementing such subpixel registration are themselves well known and would be familiar to one of ordinary skill in the art.

In the preferred embodiment, the range to observed points in the scene is computed by the following equation:

$$Z = -B*F/D$$

where Z represents the distance from the plane of the rectified camera image to the observed point in question, D is the disparity value at a pixel calculated as the image-plane distance between matched pixels, B is the baseline distance, and F is the internal scaling factor along epipolar lines. The result of computing the range Z to all pixels for which a disparity D has been computed is referred to as a range map.

The three-dimensional coordinates of the points in the range map are computed as:

$$X = Z*(u-uc)/fx$$

$$Y = Z*(v-vc)/fy$$

where uc and vc are the optical center of the camera image, fx and fy are the internal scaling factors in the x and y directions, respectively. In common practice, fx and fy are designed to be equal to F above. These parameters are computed by a calibration process that would be familiar to one of ordinary skill in the art. The values u and v are image coordinates of a pixel and are intrinsic to the image array of the camera. The value Z is the range computed for that pixel location as described above. The resulting (X,Y,Z) triple is the spatial location of an observed image point expressed with respect to the rectified image for which disparities were calculated, whereby the X direction lies along image rows and points to the right, the Y direction lies along image columns and points downward, and the Z direction is orthogonal to the image plane and points forward through the lens toward the viewed scene. In the preferred embodiment, it is additionally possible to compute both range and three-dimensional points in terms of other externally supplied coordinate systems, and to compute range or three-dimensional points for any subset of pixels for which disparity values were calculated.

Figure 4:
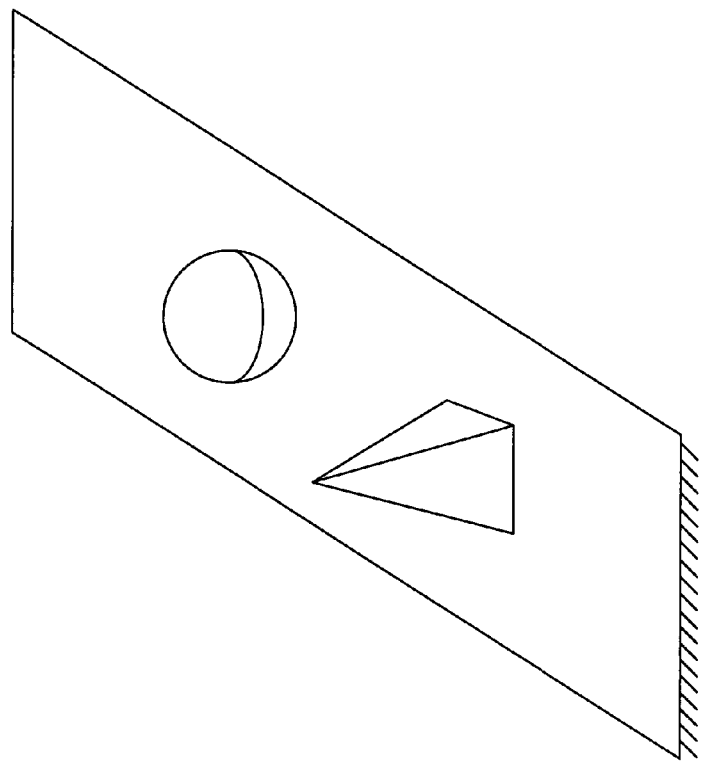
FIG. 4 is a symbolic diagram depicting a preferred arrangement of the camera and projector components in a three-camera or trinocular embodiment of the invention.
Figure 4:
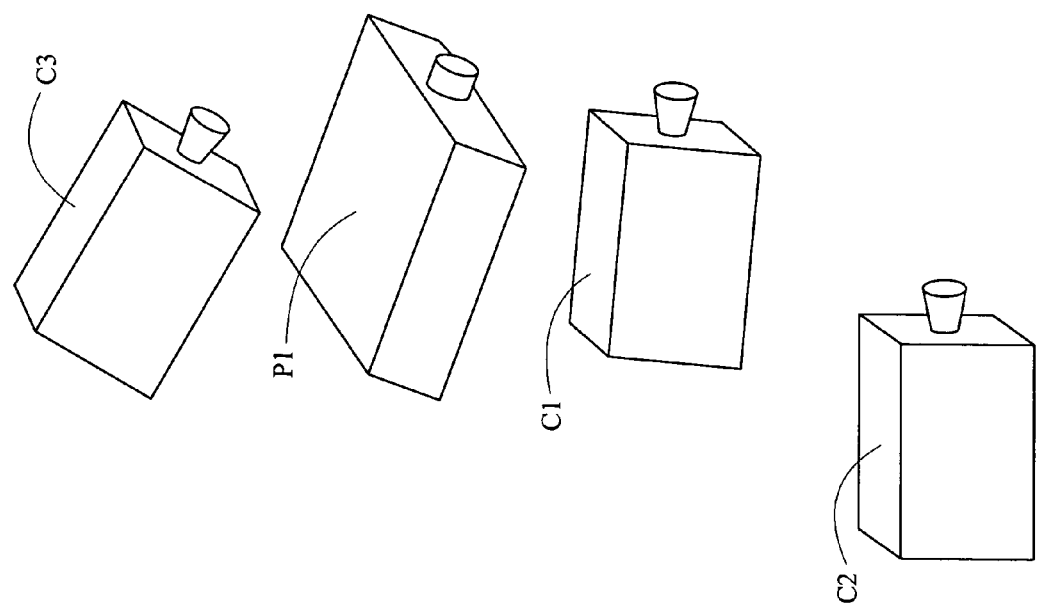

The discussion above can now be generalized to more than two cameras. FIG. 4 depicts an arrangement of three cameras C1–C3 arranged in an L shape with the projection device P placed between cameras C1 and C3 in vertical alignment therewith. The image rectification for the FIG. 4 embodiment is chosen to produce images with different scale values in the vertical and horizontal directions. These values are chosen so that the possible disparity values for the "C1-C3" and "C1-C2" camera pairs are the same for a given designed working range. The rectification also is also chosen to ensure that epipolar directions of the C1-C2 pair correspond to camera rows in the rectified C1 and C2 images, and epipolar directions of the C1-C3 pair correspond to columns of the rectified C1 and C3 images.

A specific embodiment of the invention makes use of these two camera pairs by projecting either two straight LUPs, one aligned along the epipolar bands of the C1-C2 pair and one aligned along the epipolar bands of the C1-C3 pair, or by projecting one rolled LUP approximately aligned with the epipolar bands of the C2-C3 pair. The former method has the advantage that each pair of images sense a pattern optimized for that image pair; the latter method has the advantage that a single LUP can be processed by any or all camera pairs.

In the specific embodiment, the disparity maps from the C1-C3 pair and the C1-C2 pair are computed independently and are subsequently combined by taking the disparity value for each location with the largest correlation value.

For disparity to be computed based on the LUP, it is necessary that the corresponding point in the scene be illuminated by at least one LUP and imaged by at least one pair of cameras. Areas that do not satisfy this condition are called "range shadows."

In the preferred embodiment, two of the cameras (C1 and C3) are arranged one above the other, each viewing the scene from above and at an downward slanting angle; the projector P is located along the line defined by C1 and C3. The third camera C2 is laterally spaced from the other cameras and projector. This arrangement insures that range shadows rarely occur in typical scenes.

FIG. 5 illustrates the arrangement of the two cameras C1 and C3 and projector P, and demonstrates how a surface of an object within the images scene would need to be oriented to produce a range shadow. The tangent plane to the surface, T, would need to be below the optical center of the projector P. Geometrically, this is possible and is illustrated in the figure. However, in typically occurring scenes this is rarely the case.

In a specific exemplary implementation, patterns are represented in up to three bands, each band consisting of gray scale values and being projected onto the surfaces in the scene by the aforementioned projector using visible light as the source of radiant energy. Although the projection device can generate 256 gray scale values, the pattern occupies a range of 192 gray scale values ranging from 51 to 243. These values were chosen to provide the best viewing of the LUP under ordinary viewing conditions. Three Sony DFW-SX900 cameras in the afore-mentioned L shape are the sensors for acquiring images of the scene from a plurality of viewing positions. The cameras operate using a fixed shutter time of $1/14^{th}$ of a second. They are equipped with 12 mm lenses manually focused and with manually adjusted aperture. In this implementation, a variable number of image bands may be acquired, either using the inherent color capabilities of the cameras, and/or by performing multiple projection and acquisition cycles on a static scene. In cases where the LUP as projected makes use of color bands, the YUV image is transformed to an RGB representation, and matching is performed on the resulting three-band image. When the projected pattern does not contain color, only the Y component of the acquired images is retained for the purposes of matching.

Alternative Equivalent Embodiments and Implementations

The invention has been described with reference to certain preferred embodiments and implementations. Various alternative embodiments and implementations are set forth below. It will be recognized that the following discussion is intended as illustrative rather than limiting.

Although this foregoing section describes LUPs for several specific patterns, a specific shape and size of pattern window, and a particular region of uniqueness, the projection pattern may be any size or shape, the pattern window may be any size or shape, the pattern window may not be spatially contiguous, and the region over which the pattern window is unique may be of any size, shape, or sampling scheme. One of ordinary skill in the art will realize that there are many sizes and shapes of patterns over which local uniqueness can be defined.

In the preferred embodiments, the LUP is computed as a discrete array of values. In one of the preferred embodiments, the base pattern is the result of discretizing a sampled group of sine waves with varying phase and frequency; the measure of similarity for choosing a pattern is normalized cross-correlation. In another of the preferred embodiments, the LUP is constructed over a two-symbol alphabet; the measure of similarity for choosing a pattern is Hamming distance. In other embodiments, the LUP may be constructed on a discrete alphabet with more than two symbols. In other embodiments, the LUP may be a composed of different continuous functions that may vary in amplitude, spatial frequency, phase or any of these in combination. The continuous functions may be sampled and discretized, or may be implemented using an appropriate continuous medium.

In alternative embodiments, various measures of similarity may be used for choosing a pattern. These measures may be defined directly on the pattern values themselves, including measures such as Hamming distance, vector distance, weighted vector distance, or other discrete or continuous methods of scoring pattern similarity. The measure may also be defined when various properties of the pattern to be projected are considered, including pattern scaling and foreshortening effects, discrete sampling effects, the point spread function of the projection device and/or sensing devices, and noise in the sampled image. The scoring function might be any of the methods used to compare match windows, including negative sum of squared distance, negative sum of absolute distance, cross-correlation, normalized cross-correlation. One of ordinary skill in the art will realize that there are many equivalent methods of scoring pattern windows.

A pattern can be represented in an image to be projected by encoding the pattern values as gray values, or as color values, or as multi-spectral values, or as a time sequence of values to be projected. One of ordinary skill in the art will recognize that there are many other similar ways to represent a pattern in an image.

When represented in some medium, the LUP may be filtered, color balanced, contrast enhanced, or otherwise altered to improve its projection or imaging properties.

The LUP may consist of multiple bands that are rendered as a single multi-banded image, multiple images that are simultaneously or sequentially projected, or as multiple rows or columns of an image, or any combination thereof.

In the preferred embodiment, an LUP of arbitrary size is created by replicating a single base pattern to increase its length, and by adjoining copies of a base pattern to the top and bottom of a LUP to increase its height. When adjoining the base pattern to the top and bottom, one may adjoin the base pattern at corresponding locations, or one may adjoin the base pattern while incorporating a fixed shift left or right, or one might adjoin the base pattern with a random shift. One may use the same shift or different shifts in different bands. One may also choose to change the resolution of the base pattern by duplicating values to increase its size, or by interpolating new values between old values, or combinations of both. One of ordinary skill in the art will realize that there are many ways of taking a base pattern and creating a larger LUP from copies of it, possibly altered in relative position, size, orientation, aspect ratio, resolution, or sharpness of detail.

The LUP may be composed by replicating a single base pattern, or may be composed by replicating multiple base patterns. The replication of a base pattern may be regular or irregular, provided the replication preserves local uniqueness.

The LUP may be created without using a base pattern. An LUP might also be constructed by generating a random pattern of the desired size, and checking to see if it is an LUP. Alternatively, one might generate a pattern according one or more fixed rules and check to see if it is an LUP. Alternatively, one might create rules that generate LUPs. Alternatively, one might do any of the above, and then initiate a search process to refine the pattern until it is an LUP. The search might be deterministic or random. One of ordinary skill in the art will realize that there are many algorithms that can be employed to produce LUPs.

As noted in the preferred embodiment, different LUPs may have different properties due to the ambient imaging conditions and the characteristics of the surface being imaged. As a result, the proper LUP to be used may change over time. In alternative embodiments of the invention, the LUP could be chosen based on sensor measurements of the surrounding situation, or may be made contingent on the result of prior image acquisition system processing. In that latter case, the pattern may be adapted by observing the location and number of dropouts, and adjusting the LUP based on the properties of the image in that location. The LUP may be taken from a stored set of patterns, or it may be adapted online. The LUP may be adjusted to improve the range of frequencies present when projected on one or more surfaces of the scene. One of ordinary skill in the art will realize that there are many equivalent methods of adapting LUPs to improve the performance of a 3-D image acquisition system.

The size of an LUP for a 3-D image acquisition system can be derived from the combination of projector and sensor geometry, as well as the resolution of the projector and the sensing systems. In the preferred embodiment, disparity values are computed assuming that all the points in the scene lie in a certain depth range called the "designed working range". Alternatively, disparity values can be computed without making assumptions on the working range. Doing so requires that matching be performed over a wider set of possible disparity values. Methods for determining the size and shape of a projected pattern in an image, the number of necessary disparity values in an image, and thereby the values that govern the generation of the pattern image can be realized in any number of ways, and would be familiar to one of ordinary skill in the art.

In the 3-D image acquisition system, one or more devices project an LUP onto surfaces in the scene. In the preferred embodiment, the device for projecting an LUP is a commercially available liquid crystal display ("LCD") projector such as the Hitachi CP-X270 projector. In other embodiments, the device for projecting an LUP may be another type of LCD projector. Alternatively, it may be a digital light processor ("DLP") projector. Alternatively, it may be a light source combined with a diffracting device. Alternatively, the projecting device may be a light source combined with an opaque or semi-opaque film on which the pattern is imprinted. Those of ordinary skill in the art will recognize that other means for projecting a pattern achieve equivalent results, provided that the projected image has the required size, brightness, and resolution.

The source of radiant energy may be an incandescent light, a light emitting diode ("LED"), a laser diode, or any other source of radiation within a desired spectrum. The term "radiant energy" is taken to include any of the following portions of the electromagnetic spectrum:

(a) the visible light spectrum; or
(b) the ultraviolet light spectrum; or
(c) the infrared light spectrum; or
(d) the spectrum extending from the ultraviolet to the infrared.

Those of ordinary skill in the art will recognize that other wavelengths of radiant energy can be used to achieve equivalent results, provided only that the wavelength used is consistent with the employed projection device, sensing device, and the required projection and/or sensing resolution.

The source of energy may be other than from the electromagnetic spectrum, provided only that the source can generate sufficient different pattern values and the sensor is capable of detecting the energy source with sufficient resolution.

In certain applications, it is desirable that the pattern be imperceptible to human viewers. This condition may be accomplished by using a portion of the electromagnetic spectrum that is not perceived by the human visual system. Ultraviolet and infrared are two examples of such portions of the spectrum. Alternatively, the visible spectrum may be used, but the pattern rendered imperceptible by projecting a sequence of two or more patterns within a projection interval, the patterns chosen so cancel each other out when perceived by the human visual system. Alternatively, other sources of energy not perceived by humans may be used. Those of ordinary skill in the art will recognize that there are many ways of rendering a projected pattern imperceptible to humans but perceptible to the sensors of the system.

Sensors acquire images of the scene from a plurality of viewing positions. In the preferred embodiment, the sensing means is provided by three commercially available CCD cameras such as the Sony DFW-SX900. In other embodiments, two or more sensors for acquiring image of the scene from a plurality of viewing positions may be implemented by a plurality of other makes or models of CCD cameras. Alternatively, they may be implemented by a plurality of CMOS cameras. Alternatively, they may be implemented by both CCD and CMOS cameras. Alternatively, they may be implemented by CCD or CMOS cameras equipped with special filters to enhance a specific range of wavelengths of radiant energy.

Sensors for acquiring images may further include any of the following:
(a) conventional black and white cameras; or
(b) line scan cameras; or
(c) color cameras; or
(d) infrared cameras; or
(e) ultraviolet cameras; or
(f) multi-spectral cameras; or
(g) other equivalent spatial, light-sensitive devices.

Those of ordinary skill in the art will recognize that there are other similar sensors that can be used to achieve equivalent results in sensing the scene as an image.

In the preferred embodiment, the cameras operate with a fixed shutter time, fixed focal length, and fixed aperture. In alternative embodiments, the sensors for acquiring images may be adapted to the surrounding situation or the results of prior image acquisition system operation. The shutter time and aperture may be adjusted to improve depth of field, contrast, brightness, or other similar image qualities. The white balance might be adjusted to improve color separation. The focal length may be adjusted to improve image detail or to increase the field of view. The sensors may be adjusted independently, or together. The projection device(s) may also be adjusted in brightness, contrast, or color balance. The projection device(s)s may be adjusted independently or together. The projection device(s) may be adjusted independently of the sensors for acquiring images, or they may be adjusted in conjunction with the sensors for acquiring images. One of ordinary skill in the art will realize that there are many equivalent means of adjusting sensors for acquiring images and projection devices to optimize the disparity maps computed in the resulting images.

Sensors acquiring images of the scene from a plurality of viewing positions may be implemented by one physical sensor per position. Alternatively, it may be implemented by a smaller number of physical sensors and an apparatus for switching images from a plurality of positions to the smaller number of physical sensors. The apparatus for switching images may be mirrors, light valves, prisms, or other equivalent means. In the case of a switching implementation, the several images multiplexed onto one physical sensor may be captured sequentially or simultaneously onto different portions of the sensors' image planes. Alternatively, the plurality of sensors may be implemented by a smaller number of physical sensors that are moved between successive acquisitions of images. Those of ordinary skill in the art will recognize that there are other similar means for acquiring images of the scene from a plurality of viewing positions using a smaller number of physical sensors.

In the preferred embodiment, the source of radiant energy for projecting a pattern is arranged along the camera baseline so that the rows of projected images are roughly parallel to the line joining the optical centers of two cameras. Alternatively, the projector might be coincident with one or more of the sensors for acquiring images. Alternatively, the projector may be elsewhere in space, provided a relationship between the spatial properties of the projected pattern and the spatial properties of the images can be determined.

If there is a plurality of devices for projecting patterns, they may operate synchronously, or they may operate asynchronously. They may operate by projecting patterns serially in time, or they may operate at the same time. They may project in the same spectral band, or in differing spectral bands. They may each project a LUP, or they may project a LUP as a result of their joint operation.

In the preferred embodiment, the acquired images are rectified to have parallel scanlines. Given two such images and a known minimal window size, a search is performing using a means for matching corresponding pixels in the images. A match is found by maximizing a scoring function between candidate regions of the image, where the candidates are at least the known minimal window size and the search region is no larger than that encompassing a non-repeating portion of the projected pattern as it appears in the sensed images. The scoring function may include any of the following:
(a) the negative sum of squared differences between said candidate regions; or
(b) the negative of the normalized sum of square differences of said candidate regions; or
(c) the cross-correlation of said candidate regions; or
(d) the normalized cross-correlation of said candidate regions; or
(e) the sum of absolute differences of said candidate regions; or
(f) the normalized sum of absolute differences of said candidate regions.

Those of ordinary skill in the art will recognize that there are many other similar functions that can be used as a distance function to achieve equivalent results in matching.

In the preferred embodiment, matching is performed independently on image windows. However, the best match in a window may also depend on matches in surrounding windows. The best match for a window under these constraints may be performed by dynamic programming along epipolar lines, or it may be performed by dynamic programming though the entire image, or it may be performed using graph optimization techniques. The matching may make use of a set of match locations defined in the image, or it may make use of match locations defined by choosing a set of range values for the resulting matched points, or any combination of both. One of ordinary skill in the art will realize that there are many equivalent methods for performing matching over a set of match locations.

In the preferred embodiment, a single rectification of images is chosen. Alternatively, rectifications may be chosen to enhance the properties of each pair of images. Alternatively, rectifications may be chosen to emphasize surfaces at a particular distance, or forming a particular angle with respect to one or more sensors for acquiring images or projection devices. The system may make use of multiple rectifications, each designed to emphasize one or more surfaces or optimize images from one, two, or more sensors for acquiring images, or optimize the appearance of the locally unique pattern that is projected by one of the projection devices. One of ordinary skill in the art will realize that there are many equivalent means of achieving image rectification.

In the preferred embodiment, matching is performed on images at a single resolution. However, an LUP may also be constructed so that it remains locally unique when sampled at a specified set of lower resolutions. In this case, disparity calculations may also be performed on images sampled at lower resolution. Disparity calculations on lower resolution images may be used to initialize, improve, or accelerate disparity calculations at higher resolutions. Likewise, matching may be performed at a selected subset of image locations, and those locations used to infer disparities at other locations. Coarse to fine strategies such as these would be familiar to one of ordinary skill in the art.

In the preferred embodiment, if the projected pattern does not make use of color bands, matching is performed on YUV images where the color (UV) components have been removed. Otherwise, matching is performed on an RGB representation of the YUV components. Alternatively, the matching might be performed directly on a YUV representation of the image. Alternatively, other linear or nonlinear color transformations may be applied to the image before matching. Alternatively, the matching might be performed on single image bands independently, and the results combined. Alternatively, the matching might be performed simultaneously on images collected at a plurality of times. One of ordinary skill in the art will realize that there are several ways of achieving equivalent results by performing matching on different image representations.

The acquired images may also be pre-processed with image processing operations that include any one or combination of the following operations:
(a) Local averaging
(b) Low-pass filtering
(c) Low-pass filtering combined with high-pass filtering
(d) Median filtering
(e) Filtering with a Laplacian of a Gaussian
(f) Rank transformation
(g) Census transformation Those of ordinary skill in the art will also recognize that there are many similar linear and non-linear image-processing operations that may be applied to the acquired images before the matching process is applied.

In the preferred embodiment, matching is performed on images acquired while the scene is illuminated with the pattern. Alternatively, the matching may involve taking an image of the scene first without the projected illumination and then with the scene uniformly illuminated and using these two images to compensate for the surface albedo at each image location. The projection of uniform illumination and patterned illumination may take place over time, or, alternatively, may be accomplished by projecting the pattern and its inverse, or, alternatively, may take place by simultaneously projecting radiant energy in a plurality of spectral bands over which scene albedo is nearly constant. One of ordinary skill in the art will recognize that there are many ways of making use of LUPs in combination with other forms of projected light to achieve equivalent results.

Although the means for matching corresponding pixels in images has been described as being applied along the rows of rectified images, it may also be applied along corresponding epipolar lines of images that do not have this special form. The matching process may be applied by choosing matching corresponding pixels for regions in any image by searching along the epipolar lines in any other image. One of ordinary skill in the art will realize that there are many equivalent algorithms for implementing the matching means.

In some variants of the preferred embodiments, matching is done using two windows. According to a specific two-window matching technique, a first window is oriented horizontally, resulting in a "wide disparity match" and a second window is oriented vertically, resulting in a "tall disparity match". The two correlation scores are compared and, for each pixel, the disparity value with the highest correlation score is kept. Alternatively, there may be multiple windows of other size or orientation. Also, the means for combining results of comparisons may be other than the highest correlation. For example, it may be selected from the group consisting of:
(a) the match with highest score, and
(b) the average of the match values for each match region shape and size, and
(c) the weighted average of the match values, and
(d) the weighted average of match values above a fixed threshold, and
(e) the weighted average of match values above a varying threshold, and
(f) other linear or nonlinear combinations of comparison function values and disparity values.

One of ordinary skill in the art will realize that there are many different choices for the various windows and means for combining their results.

In the preferred embodiment, match windows have been taken to be of a fixed size based on the structure of the LUP. However, the match window size may be altered in size or shape as matching is performed based on the amount of ambient texture in the scene, prior knowledge of surface slant or tilt, the image signal to noise ratio, the image brightness, the image contrast, the image variance, or other equivalent image measures. The match window may be made smaller than the minimum preferred size when significant external textural elements are present. The match window may be made smaller than the minimum preferred size in situations where a small number of incorrect or missing disparities are tolerable. One of ordinary skill in the art will understand that match windows may be altered in size and shape as matching proceeds.

The preferred embodiment has been described using both two and three cameras. When using three or more cameras, they may be used as pairs or in larger groups, or any combination thereof. When using them as independent groups, the disparity maps so produced may be combined or may be used separately.

The specific embodiment of the invention as disclosed above consists of three cameras whereby it makes use of two of the camera pairs independently, and then subsequently combines the resulting disparity maps. The projected pattern is either two straight patterns, one for each camera pair, or a single rolled LUP arranged so that there is a LUP for both camera pairs. In alternative embodiments, it would be additionally possible to make use of the diagonal (C2-C3) camera pair. In this case, another pattern might be projected for that pair, or the rolled pattern may be constructed so that there is an LUP in the epipolar bands of that camera pair, or any combination thereof. When using multiple cameras, the LUP may be optimized for a single pair, a larger group, or the entire ensemble. There may be one LUP or multiple LUPs. Images may be acquired simultaneously of all LUPs, or specific groups of cameras may acquire specific LUPs. The LUPs may be straight LUPs, rolled LUPs, any combination of straight and rolled LUPs, or any combination thereof. The bands of the patterns may differ as to whether they are straight or rolled, or neither of the above. One of ordinary skill in the art will recognize there are many equivalent ways of combining LUPs with multiple cameras to achieve an equivalent embodiment.

The specific embodiment computes disparities by computing match scores for a window in one camera against windows in a second camera. In alternative embodiments, disparities may be computed at once by computing match scores for a given match window in one camera with match windows in multiple other cameras simultaneously. When computing such match scores, the score for the window may be computed as any combination of individual match scores, including:
1. The sum of the match scores
2. The product of the match scores
3. The minimum match score
4. The maximum match score
5. The average match score
6. The weighted average match score
7. The median match score
8. Other linear or nonlinear functions that combine match scores.

In the preferred embodiment, information is combined from multiple disparity maps. In the case of three cameras, it is possible to arrange image rectification so that this is possible. With more than three cameras, it may not be possible or convenient to directly combine disparity maps. In an alternative embodiment, information from different groups of cameras may be combined as range maps, or information may be combined as sets of three-dimensional points, or information might be combined as triangulated meshes, or information might be combined as surfaces, or information might be combined as volumes. One of ordinary skill in the art will recognize that there are many equivalent means of combining disparity or range information computed from multiple groups of cameras.

In the preferred embodiment, disparity maps are computed in camera images without recourse to recovering the projected pattern values in the camera images. In an alternative embodiment, the pattern values appearing in camera images might be estimated, and a disparity map or a range map may be computed by comparing these recovered pattern values to the LUP. Disparities can thus be computed by using a known relationship between the sensors for acquiring images and the projection device. These disparity maps or range maps may be combined with disparity or range maps computed from camera images using any of the equivalent means disclosed above. Alternatively, an existing disparity map might be verified by recovering the LUP as it appears in sensed images, and comparing the recovered pattern values with those projected by the projection device. One of ordinary skill in the art will realize that there are many equivalent means of combining disparity or range computed by matching the projected LUP to a pattern recovered from an image with disparity or range computed by matching in two or more sensed images.

The preferred embodiment describes the projection device as being located along the baseline of a camera pair. The projection element may be so located, or may be elsewhere located, provided it illuminates some portion of the scene visible to the cameras, and a relationship between projected images and camera images can be established.

Once corresponding regions of the two images have been identified, the means for computing range from an image to points in the scene based on pixel correspondences uses the locations of the matched regions in the two scenes to compute range values. The range values might be from the optical center of camera C1, or the range values might be from the optical center of camera C2, or the range values might be computed from the optical center of camera C3, or the range value may be computed from any location described relative to any of the cameras, or the range value may be computed from a known external reference point. One of ordinary skill in the art will recognize that there are many equivalent means of computing range values or three-dimensional point coordinates from pixel correspondences.

It will also be recognized by those skilled in the art that, while the invention has been described above in terms of preferred embodiments, it is not limited thereto. Various features and aspects of the above invention may be used individually or jointly. Further, although the invention has been described in the context of its implementation in a particular environment and for particular applications, those skilled in the art will recognize that its usefulness is not limited thereto and that the present invention can be beneficially utilized in any number of environments and implementations.

What is claimed is:

1. A system for obtaining a disparity map of a scene, comprising:
    (a) at least one projection device configured to project a locally unique pattern onto at least a portion of the scene, where said locally unique pattern has the property that any pattern window differs from any other pattern window;
    (b) sensors for acquiring a plurality of images of the scene, each one of the plurality of images being associated with a unique viewing position, each of the images being a surface-dependent reflection by the scene of ambient light combined with the projected locally unique pattern; and
    (c) a computing device configured to generate said disparity map by matching corresponding pixels in match windows in at least two of said images by comparing the image values without recovering the projected pattern, where said match windows are chosen to be sufficiently large as to ensure that each match window includes a substantial portion of the image of a locally unique pattern window.

2. The system of claim 1, wherein the computer device is additionally configured to compute the range to points in the scene using the disparity map.

3. The system of claim 1, wherein said locally unique pattern is constructed from pattern values consisting of binary values, in which each pattern value is black or white.

4. The system of claim 1 wherein said locally unique pattern is constructed from pattern values consisting of gray-level values, in which each pattern value has an intensity chosen from a plurality of possible intensity values.

5. The system of claim 1, wherein said locally unique pattern is constructed from pattern values consisting of color values, in which each pattern value has three intensity values, one for each of red, green, and blue.

6. The system of claim 1, wherein said locally unique pattern is constructed from pattern values consisting of multi-spectral values, in which each pattern value has intensity values in a plurality of spectral bands, said spectral bands including at least one of ultraviolet light, visible light, and infrared light.

7. The system of claim 1, wherein said locally unique pattern is constructed from pattern values consisting of temporally coded values, in which each pattern value consists of a plurality of temporal bands, each temporal band being projected at a discrete time.

8. The system of claim 1, wherein said locally unique pattern is visually imperceptible to a human observer.

9. The system of claim 1, wherein said locally unique pattern includes a set of bands, each of said bands corresponding to at least one continuous function.

10. The system of claim 9, wherein said at least one continuous function is a periodic function.

11. The system of claim 10, wherein said periodic function is a sine function.

12. The system of claim 9, wherein said set of bands includes a plurality of bands each corresponding to a periodic function, and wherein at least two of said plurality of bands have different phases or periods.

13. The system of claim 1, wherein said locally unique pattern is constructed from replicating a base pattern.

14. The system of claim 13, wherein said base pattern is replicated in successive horizontal or vertical lines.

15. The system of claim 13, wherein said base pattern is shifted by one or more pixels in successive vertical or horizontal lines.

16. The system of claim 13, wherein said base pattern is constructed from first, second and third sine waves having respective frequencies of 4.2, 9.5 and 10.2 pixels and respective phase shifts of 0, 1, and 5.5 pixels, sampled to produce a base pattern of length 140.

17. The system of claim 1, wherein said locally unique pattern is a sequence constructed from a discrete alphabet of symbols.

18. The system of claim 17, wherein said locally unique pattern includes a plurality of pattern windows of specified size, and said locally unique pattern has the property that each pattern window differs from every other pattern window by at least a specified Hamming distance.

19. The system of claim 18, wherein said locally unique pattern has the property that every 2 row by 8 column pattern window differs from every other 2 row by 8 column pattern window within any given 2 row by 146 column Window that contains it by a Hamming distance of at least 3.

20. The system of claim 18, wherein said locally unique pattern has the property that every 9 row by 2 column pattern window differs from every other 9 row by 2 column pattern window within any given 9 row by 146 column window that contains it by a Hamming distance of at least 3.

21. The system of claim 17, wherein said locally unique pattern has the property that each pattern window is distinguishable from each other pattern window in accordance with a simulated imaging scoring method, said method including the steps of (a) deriving a lowest value of a first match score representative of matching a pattern window with itself; taking into account a pixel offset of one-half, and (b) comparing the lowest value of the first match score to the highest value of a second match score representative of matching the pattern window .to other pattern windows.

22. The system of claim 1, wherein said locally unique pattern is chosen to optimize a pattern score that is a function of at least one of:
 (a) pattern scaling and foreshortening effects;
 (b) discrete sampling effects;
 (c) properties of at least one projection device;
 (d) properties of at least one sensor, and
 (e) properties of the scene.

23. The system of claim 1, wherein said computing device is configured to compare match windows, said match windows being chosen to be sufficiently large as to ensure that said match windows include the image of a locally unique pattern.

24. The system of claim 1, wherein said computing device is configured to compare match windows, said match windows being smaller than that required to include the image of a locally unique pattern.

25. The system of claim 1 wherein the computing device is configured to:
 (a) compare a first set of match regions having a first size and shape;
 (b) compare a second set of match regions having a second size and shape different front the first size and shape; and
 (c) combine the results of steps (a) and (b);
 wherein each match region covers a locally non-repeating pattern window.

26. The system of claim 25, wherein said first set of match regions are in the form of horizontally-oriented rectangles and the second set of match regions are in the form of vertically-oriented rectangles.

27. The system of claim 1, wherein said viewing positions include a first and a second viewing position, said first viewing position being arranged above said second viewing position, and said projection device disposed along the line defined by said first and second viewing positions.

28. The system of claim 1, wherein said sensors acquire at least three images, each image being associated wit a unique viewing position.

29. The system of claim 28, wherein said disparity map is computed simultaneously from all of said at least three images.

30. The system of claim 28, wherein a plurality of pairwise disparity maps are computed, each one of the plurality of pairwise disparity maps being computed from a unique pair of images, and said plurality of pairwise disparity maps are combined to form a composite disparity map.

31. The system of claim 30, wherein a single locally unique pattern is projected.

32. The system of claim 30, wherein at least two locally unique patterns are projected, each locally unique pattern being chosen to optimize the pairwise disparity map computed for a pair of images.

33. The system of claim 1, wherein said at least one projection device is co-located with one of the viewing positions.

34. The system of claim 1, wherein said locally unique pattern is computed online or selected from a set of candidate patterns based on properties of at least one previously constructed disparity map computed on images acquired using at least one other locally unique candidate pattern.

35. A method for obtaining a disparity map of a scene, comprising the steps of:
(a) causing a locally unique pattern to be projected onto at least a portion of the scene, where said locally unique pattern has the property that any pattern window differs from any other pattern window;
(b) receiving a plurality of images acquired of the scene, each one of the plurality of images being associated with a unique viewing position, each of the images being a surface-dependent reflection by the scene of ambient light combined with the projected locally unique pattern; and
(c) generating said disparity map by matching corresponding pixels in match windows in at least two of said images by comparing the image values without recovering said locally unique pattern, where said match windows are chosen to be sufficiently large as to ensure that each match window includes a substantial portion of the image of a locally unique pattern window.

36. The method of claim 35, further comprising a step of computing the range to points in the scene using the disparity map.

37. The method of claim 35, wherein said locally unique pattern is constructed from pattern values consisting of gray-level values, in which each pattern value has an intensity chosen from a plurality of possible intensity values.

38. The method of claim 35, wherein said locally unique pattern includes a set of bands, each of said bands corresponding to at least one continuous function.

39. The method of claim 38, wherein said set of bands includes a plurality of bands each corresponding to a periodic function, and wherein at least two of said plurality of bands have different phases or periods.

40. The method of claim 35, wherein said locally unique pattern is a sequence constructed from a discrete alphabet of symbols.

41. The method of claim 40, wherein said locally unique pattern includes a plurality of pattern windows of specified size, and said locally unique pattern has the property that each pattern window differs from every other pattern window by at least a specified Hamming distance.

42. The method of claim 40, wherein said locally unique pattern has the property that each pattern window is distinguishable from each other pattern window in accordance with a simulated imaging scoring method, said method including the steps of (a) deriving a lowest value of a first match score representative of matching a pattern window with itself, taking into account a pixel offset of one-half, and (b) comparing the lowest value of the first match score to the highest value of a second match score representative of matching the pattern window to other pattern windows.

43. The method of claim 35, wherein said locally unique pattern is chosen to optimize a pattern score that is a function of at least one of:
(a) pattern scaling and foreshortening effects;
(b) discrete sampling effects;
(c) properties of at least one projection device;
(d) properties of at least one sensor; and
(e) properties of the scene.

44. The method of claim 35, wherein the step of matching corresponding pixels includes a step of comparing match windows, said match windows being chosen to be sufficiently large as to ensure that said match windows include the image of a locally unique pattern.

45. The method of claim 35, wherein the step of matching corresponding pixels includes a step of comparing match windows, said match windows being smaller than that required to include the image of a locally unique pattern.

46. The method of claim 35, wherein the step of matching corresponding pixels includes the steps of:
(d) comparing a first set of match regions having a first size and shape;
(e) comparing a second set of match regions having a second size and shape different from the first size and shape; and
(f) combining the results of steps (d) and (e);
and wherein each match region covers a locally non-repeating pattern window.

47. The method of claim 35, wherein the step of comparing pixels includes computing a plurality of pairwise disparity maps, each one of the plurality of disparity maps being computed from a unique pair of images, and combining the plurality of pairwise disparity maps to generate a composite disparity map.

48. A computer-readable medium storing information for performing the steps of;
(a) causing a projection device to project a locally unique pattern onto at least a portion of a scene, where said locally unique pattern has the property that any pattern window differs from any other pattern window;
(b) receiving a plurality of images of the scene, each one of the plurality of images being associated with a unique viewing position, each of the images being a surface-dependent reflection by the scene of ambient light combined with the projected locally unique pattern; and
(c) generating a disparity map by matching corresponding pixels in match windows in at least two of said images by comparing the image values without recovering said locally unique pattern, where said match windows are chosen to be sufficiently large as to ensure that each match window includes a substantial portion of the image of a locally unique pattern window.

* * * * *